US009146749B1

(12) United States Patent
Sivertsen

(10) Patent No.: US 9,146,749 B1
(45) Date of Patent: Sep. 29, 2015

(54) SYSTEM AND METHODS FOR UPDATING DIGITAL SIGNAGE DEVICE OPERATING SYSTEMS AND REGISTERING SIGNAGE DEVICES TO A GLOBAL NETWORK

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 14/103,254

(22) Filed: Dec. 11, 2013

(51) Int. Cl.
G06F 9/44 (2006.01)
G06F 9/445 (2006.01)

(52) U.S. Cl.
CPC .............. *G06F 9/4416* (2013.01); *G06F 8/65* (2013.01); *G06F 8/61* (2013.01)

(58) Field of Classification Search
None
See application file for complete search history.

(56) References Cited

U.S. PATENT DOCUMENTS

| 5,717,930 | A | 2/1998 | Imai et al. | |
|---|---|---|---|---|
| 6,351,850 | B1 | 2/2002 | van Gilluwe et al. | |
| 7,062,765 | B1 * | 6/2006 | Pitzel et al. | 717/177 |
| 7,822,963 | B2 | 10/2010 | Willems | |
| 8,866,911 | B1 * | 10/2014 | Sivertsen | 348/177 |
| 2003/0041127 | A1 * | 2/2003 | Turnbull | 709/220 |
| 2009/0198816 | A1 * | 8/2009 | Bannister et al. | 709/225 |
| 2011/0119556 | A1 * | 5/2011 | de Buen | 714/758 |
| 2013/0086577 | A1 * | 4/2013 | Nakashima et al. | 717/178 |
| 2013/0252590 | A1 | 9/2013 | Clas Sivertsen | |
| 2014/0067549 | A1 * | 3/2014 | Park et al. | 705/14.68 |

OTHER PUBLICATIONS

Andrew. "How to Get Hardware Information in Linux." Web UPD8. N.p., Jul. 27, 2011. Web. Jan. 6, 2015. <http://www.webupd8.org/2011/07/how-to-get-hardware-information-in.html>.*
DigitalSignage. "mediaBOX User's Manual version 3.0." DigitalSignage. N.p., Nov. 14, 2009. Web. Jan. 6, 2015. <http://www.digitalsignage.com/files/mediaBOX_Manualv3.0.pdf>.*
Leeky. "Step-by-step beginner's guide to installing Ubuntu 11.10." TechSpot. N.p., Oct. 15, 2011. Web. Jan. 6, 2015. <http://www.techspot.com/community/topics/step-by-step-beginners-guide-to-installing-ubuntu-11-10.172128/>.*

(Continued)

*Primary Examiner* — Wei Zhen
*Assistant Examiner* — Binh Luu
(74) *Attorney, Agent, or Firm* — Locke Lord LLP; Time Tingkang Xia, Esq.

(57) ABSTRACT

Aspects of the disclosure direct to systems and methods for updating the operating system of a signage device and registering the signage device to a global network. The signage device has a computer system. When booting, the BIOS of the computer system loads an installer to install a preferred operating system and client software onto a hard drive, and boots the preferred operating system and the client software from the hard drive. Once executed, the client software detects and transmits configuration information of the computer system to a management server of a Digital Signage Device Central Management System (SDCMS). The management server determines resources appropriate for the computer system based on the received configuration information, and sends the resources back to the client software. The client software then transmits signage device identifying information to the management server to register the signage device to a global network of managed signage devices.

25 Claims, 5 Drawing Sheets

(56) References Cited

OTHER PUBLICATIONS

Lev, Danny. "How to Manage your Digital Signage Network." ComQi. N.p., Nov. 2010. Web. Jan. 5, 2015.<http://www.comqi.com/wp-content/uploads/2013/01/How_to_Manage_your_Digital_Signage_Network_White_Paper_ComQi_Branded.pdf>.*

Stephftw. "How to Dual-boot Linux and Windows (on a PC with Windows 7 already installed)." Instructables.com. N.p., Jun. 11, 2012. Web. Jan. 5, 2015. <https://web.archive.org/web/20130318223232/http://www.instructables.com/id/How-to-Dual-boot-Linux-and-Windows-on-a-PC-with-W/?ALLSTEPS>.*

Weideman, Jane, and Scott James Remnant. "Hardware/Detection." Ubuntu Wiki. N.p., Oct. 27, 2005. Web. Jan. 6, 2015. <https://wiki.ubuntu.com/Hardware/Detection>.*

"How to Put Ubuntu Linux on a USB Thumb Drive (Without the Mess)." HowToGeek.com. N.p., Nov. 10, 2011. Web. Apr. 1, 2015. <http://www.howtogeek.com/97177/how-to-put-ubuntu-linux-on-a-usb-thumb-drive-without-the-mess/>.

Danatela. "How to use manual partitioning during installation?" AskUbuntu.com. N.p., Sep. 9, 2013. Web. Apr. 1, 2015.<http://web.archive.org/web/20131109153541/http://askubuntu.com/questions/343268/how-to-use-manual-partitioning-during-installation>.

Nhinkle. "Making the Ultimate Ail-In-One Installation Flash Drive." SuperUser.com. N.p., Dec. 22, 2011. Web. Mar. 24, 2015.<http://blog.superuser.com/2011/12/22/making-the-ultimate-all-in-one-installation-flash-drive/>.

\* cited by examiner

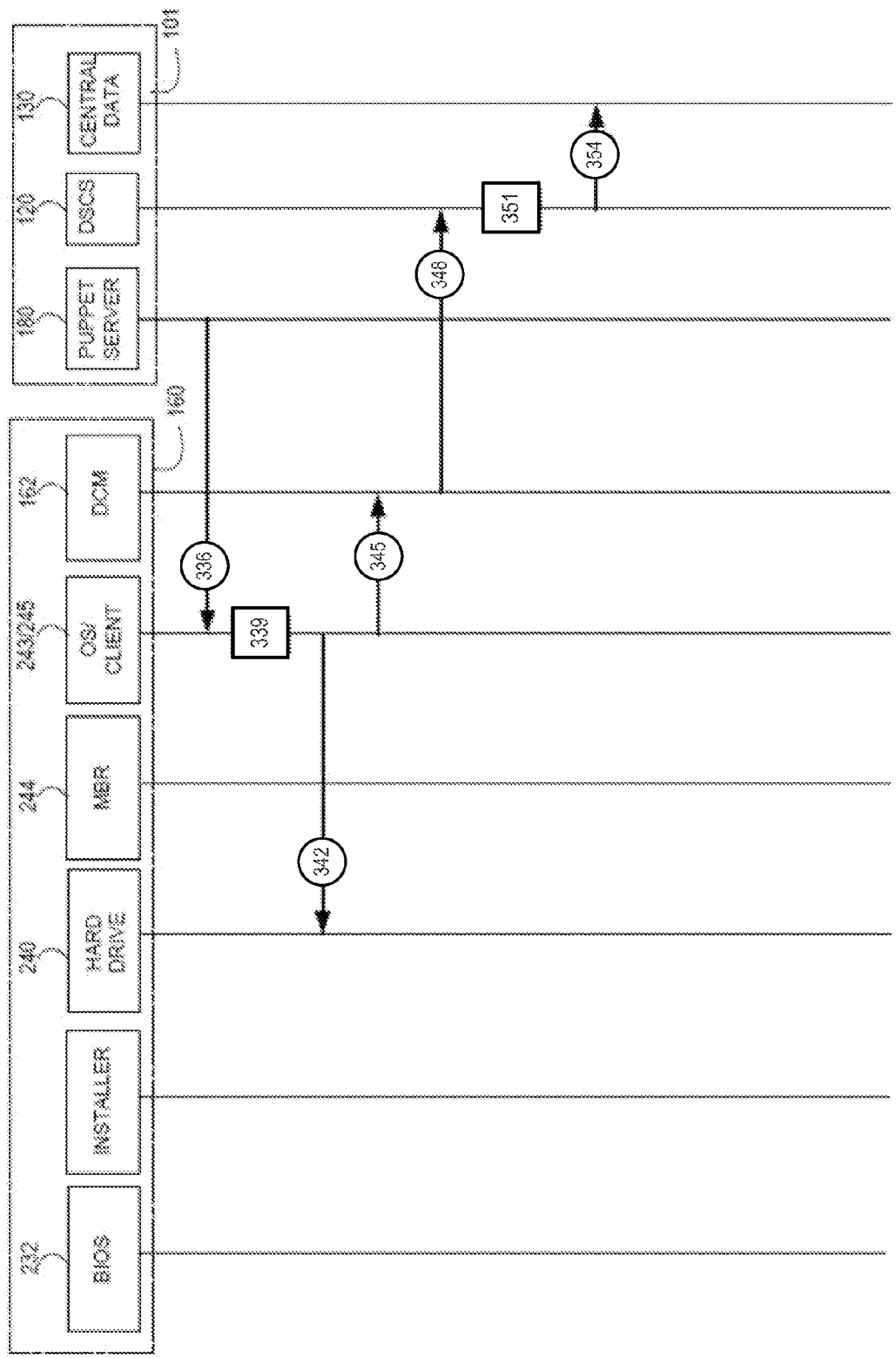

SYSTEM AND METHODS FOR UPDATING DIGITAL SIGNAGE DEVICE OPERATING SYSTEMS AND REGISTERING SIGNAGE DEVICES TO A GLOBAL NETWORK

TECHNICAL FIELD

The present systems and methods relate generally to computer hardware and software systems for updating the operating the operating system of a digital signage device and authenticating the signage device to integrate the signage device into a global network of signage devices accessible via a common portal.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, digital signage devices are preconfigured with a computer system and operating system. Because of the varying computer systems and operating systems of digital signage devices, it has been difficult to create a centrally-managed network of digital signage devices. Because it has been difficult to create and maintain a centrally-managed digital signage device network, signage device owners and advertisers have been unable to easily engage each the services of one another, which leads to lost revenue for signage device owners and lost advertising opportunities for advertisers. Therefore, there is a long-felt but unresolved need for a method for efficiently and effectively updating the operating system of a digital signage device such that it is compatible with a centrally-managed global network of digital signage devices. Further, there is a need to catalog and store signage device identifying information to authenticate signage devices and add the devices to a global network of managed signage devices.

BRIEF SUMMARY OF THE DISCLOSURE

Certain aspects of the present disclosure direct to a computer-implemented method for updating an existing operating system of a signage device having a computer system and registering the signage device with a Digital Signage Device Central Management System (SDCMS). The method includes: loading an installer into memory of the signage device computer system from a detachable bootable data storage medium; loading a preferred operating system and client software via the installer onto a hard drive of the signage device computer system from the detachable bootable data storage medium; updating a master boot registry of the signage device computer system via the installer to indicate priority of the preferred operating system; booting the preferred operating system and the client software from the hard drive of the signage device computer system; detecting signage device computer system configuration information via the client software; transmitting the signage device computer system configuration information to a management server of the SDCMS, wherein the management server determines resources appropriate for the signage device computer system based on the received signage device computer system configuration information; receiving the resources at the client software from the management server of the SDCMS; and transmitting signage device identifying information to the management server of the SDCMS, wherein the management server of the SDCMS utilizes the signage device identifying information to register the signage device to a global network of managed signage devices.

In certain embodiments, the detachable data storage medium is selected from the group including: memory card, USB drive, soft disk drive, portable hard drive, optical disk drive, data cartridge, and network storage device.

In certain embodiments, the signage device computer system configuration information comprises information relating to the group including: CPU, disks, I/O devices, network devices, and software modules.

In certain embodiments, the resources appropriate for the signage device computer system are selected from the group including: configuration parameters, device drivers, and software modules.

In certain embodiments, the software modules include a device control module (DCM).

In certain embodiments, the preferred operating system is a Linux-based operating system. In certain embodiments, the preferred operating system is Ubuntu.

In certain embodiments, the hard drive of the signage device computer system is logically divided into a plurality of logical storage units. In certain embodiments, the logical storage units are partitions. In certain embodiments, the existing operating system and the preferred operating system are stored in separate partitions.

Certain aspects of the present disclosure direct to a signage device, which includes a computer system. The computer system includes a central processing unit (CPU), a memory, a basic input/output system (BIOS) chip storing a BIOS, a hard drive storing an existing operating system, and a detachable bootable data storage medium. The BIOS, when executed at the CPU, is configured to: load an installer into the memory from the detachable bootable data storage medium; load a preferred operating system and client software via the installer onto the hard drive from the detachable bootable data storage medium; update a master boot registry via the installer to indicate priority of the preferred operating system; boot the preferred operating system and the client software from the hard drive; detect configuration information via the client software; transmit the configuration information to a management server of a Digital Signage Device Central Management System (SDCMS), wherein the management server determines resources appropriate for the computer system based on the received configuration information; receive, at the client software, the resources from the management server of the SDCMS; and transmit signage device identifying information to the management server of the SDCMS, wherein the management server of the SDCMS utilizes the signage device identifying information to register the signage device to a global network of managed signage devices.

In certain embodiments, the detachable data storage medium is selected from the group including: memory card, USB drive, soft disk drive, portable hard drive, optical disk drive, data cartridge, and network storage device.

In certain embodiments, the signage device computer system configuration information comprises information relating to the group including: CPU, disks, I/O devices, network devices, and software modules.

In certain embodiments, the resources appropriate for the signage device computer system are selected from the group including: configuration parameters, device drivers, and software modules.

In certain embodiments, the software modules include a device control module (DCM).

In certain embodiments, the preferred operating system is a Linux-based operating system.

In certain embodiments, the hard drive is logically divided into a plurality of partitions.

In certain embodiments, the existing operating system and the preferred operating system are stored in separate partitions.

Certain aspects of the present disclosure direct to a non-transitory computer readable medium storing computer executable codes. The codes, when executed at a processor, are configured to: load an installer into memory of a computer system of a signage device from a detachable bootable data storage medium; load a preferred operating system and client software via the installer onto a hard drive of the computer system from the detachable bootable data storage medium; update a master boot registry of the computer system via the installer to indicate priority of the preferred operating system; boot the preferred operating system and the client software from the hard drive; detect configuration information of the computer system via the client software; transmit the configuration information to a management server of a Digital Signage Device Central Management System (SDCMS), wherein the management server determines resources appropriate for the computer system based on the received configuration information; receive, at the client software, the resources from the management server of the SDCMS; transmit signage device identifying information to the management server of the SDCMS, wherein the management server of the SDCMS utilizes the signage device identifying information to register the signage device to a global network of managed signage devices.

In certain embodiments, the detachable data storage medium is selected from the group including: memory card, USB drive, soft disk drive, portable hard drive, optical disk drive, data cartridge, and network storage device.

In certain embodiments, the signage device computer system configuration information comprises information relating to the group including: CPU, disks, I/O devices, network devices, and software modules.

In certain embodiments, the resources appropriate for the signage device computer system are selected from the group including: configuration parameters, device drivers, and software modules.

In certain embodiments, the software modules include a device control module (DCM).

In certain embodiments, the preferred operating system is a Linux-based operating system.

In certain embodiments, the hard drive of the signage device computer system is logically divided into a plurality of partitions. In certain embodiments, the existing operating system and the preferred operating system are stored in separate partitions.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 3A and 3B are a sequence diagram illustrating an exemplary process whereby a preferred OS and puppet client are installed onto a signage device from a USB device, according to one embodiment of the present disclosure.

DETAILED DESCRIPTION

Figure 1:
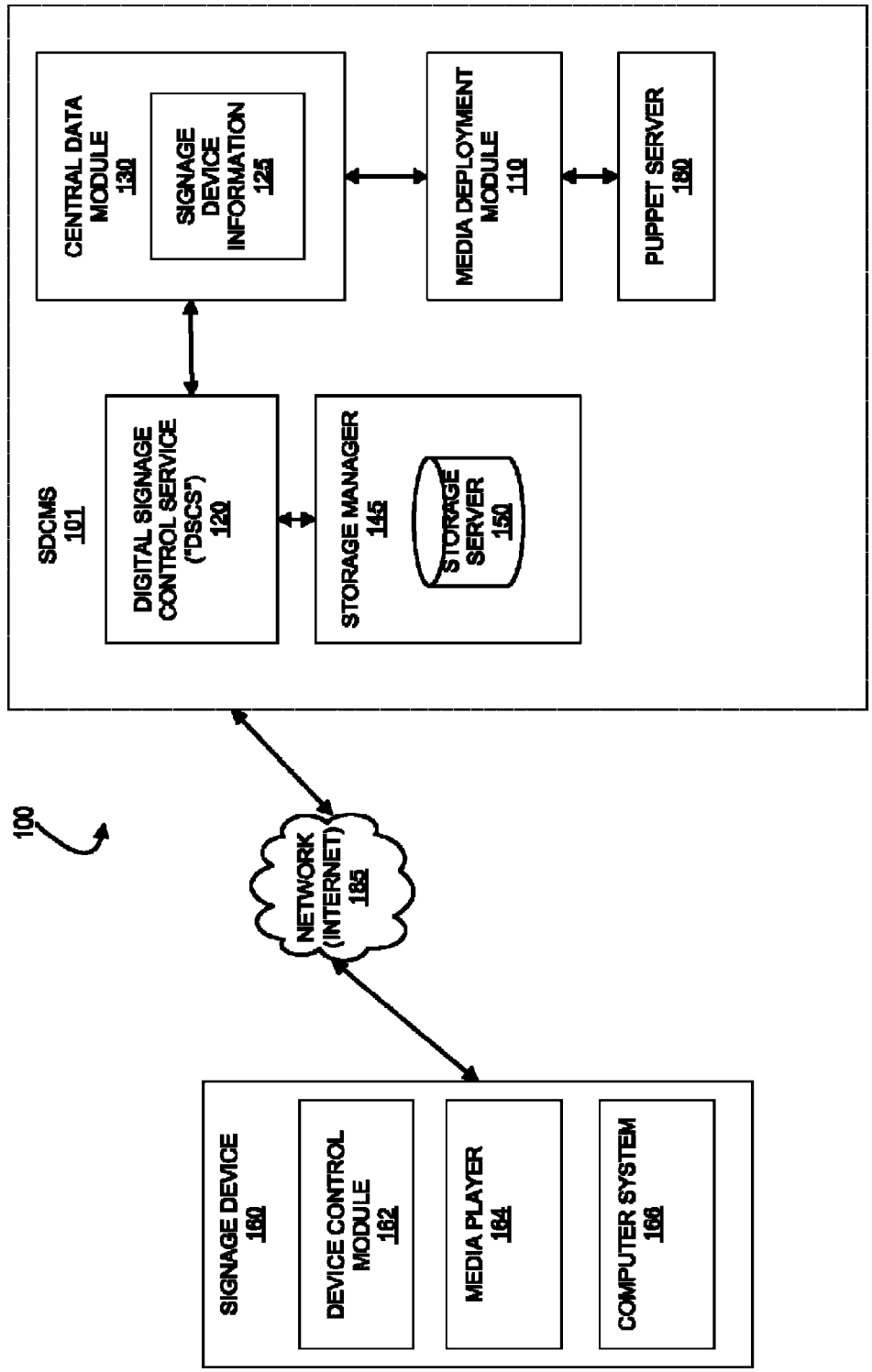
FIG. 1 illustrates an exemplary system environment in which an embodiment of the disclosed digital signage device central management system ("SDCMS") is utilized.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Aspects of the present disclosure relate generally to computer hardware and software systems updating the operating system of a digital signage device and authenticating the signage device to integrate the signage device into a global network of signage devices accessible via a common portal. According to one aspect, a digital signage device central management system ("SDCMS") is capable of receiving software and hardware information from a digital signage device, transmitting a new operating system for installation on the signage device, and registering the signage device as part of a global network of managed signage devices.

According to one embodiment, a USB device affiliated with the SDCMS contains an installer, replacement OS, and software (i.e., puppet client), all of which are installed onto the digital signage device's existing computer system. After installation of the new components onto the existing computer system, according to one embodiment, the puppet client analyzes the signage device's existing software and hardware and transmits the information to a puppet server at the SDCMS. The puppet server then returns additional software appropriate for the signage device as configured as well as various other configuration parameters, device drivers, and software modules, including a device control module ("DCM") for carrying out and coordinating the various computer-implemented processes of the signage device. The DCM then provides signage device identifying information (e.g., signage device ID) to the SDCMS such that the signage device can be authenticated and added to the global network of signage devices managed by the SDCMS.

Referring now to the figures, FIG. 1 illustrates an overview 100 of a digital signage device central management system ("SDCMS") 101 in an exemplary environment, constructed and operated in accordance with various aspects of the present disclosure. As shown in FIG. 1, the SDCMS 101 comprises a digital signage control service ("DSCS") 120 for carrying out and coordinating various computer-implemented processes of the SDCMS 101. The exemplary SDCMS 101 also comprises a central data module 130 for carrying out various other computer-implemented processes of the SDCMS 101. Embodiments of the SDCMS 101 further comprise various storage servers for storing system data and media content, such as storage server 150. Further embodiments of the SDCMS 101 comprise a puppet server 180 for delivering various content to digital signage devices associated with the SDCMS 101. Architectural details relating to various software modules, engines, and databases comprising an embodiment of the SDCMS 101 are described in greater detail below.

As discussed and according to the embodiment shown in FIG. 1, an SDCMS 101 comprises a DSCS 120, a central data module 130, and various other software engines, modules, and databases, which are operatively connected through a computer network 185. Typically, such operative connections involve a secure connection or communications protocol, and communications over a network typically involve the use of one or more services such as a Web-deployed service with client/server architecture, a corporate Local Area Network ("LAN") or Wide Area Network ("WAN"), or through a cloud-based system. According to a further embodiment not shown in FIG. 1, and as will be understood by one of ordinary skill in the art, an SDCMS 101 may comprise a unitary system, or the functionalities can be carried out by a consolidated system, and it is unnecessary for these systems to be separate and discrete.

The SDCMS 101 is in communication with a communication network 185 (such as Internet). A digital signage device 160 is in communication with the communication network 185. Though not shown, in one embodiment, a signage device or private network of signage devices may communicate with the network 185 through an entry point such as a router. Although FIG. 1 only shows a single signage device 160, it will be understood and appreciated by one of ordinary skill in the art that one or more signage devices can be deployed in a private digital network, which is connected to the SDCMS 101. Further, multiple digital signage devices and multiple private networks may be connected to an SDCMS 101 directly through the network 185. Operative connections between an SDCMS 101 and a signage device 160 or a private network of signage devices can involve a secure connection or communications protocol. Moreover, in addition to routers, various networking components such as switches, hubs, etc., are typically involved in such communications, and although not shown in FIG. 1, certain embodiments of the present disclosure may include one or more secure networks, gateways, or firewalls that provide information security from unwanted intrusions and cyber-attacks.

Typically, digital signage devices (e.g., 160) as shown in FIG. 1 are configured to display digital media content. For example, digital signage devices can display facility-related announcements, weather updates, or multimedia content such as videos or movie clips. In certain aspects, such multimedia content may comprise an advertising campaign such as a commercial. For example, in a shopping mall, a network of digital signage devices could be configured to simultaneously display information relating to a promotion at a store in the shopping mall, followed by a weather report, then an announcement informing patrons that an escalator was out of service, and then a commercial for a new soft drink. In one embodiment, each digital signage device is equipped with a computer system 166, which may be a special-purpose computer system configured specifically for the digital signage device, which will be discussed further in relation to FIGS. 2A-2B. Further, as shown in the FIG. 1 embodiment, each digital signage device is equipped with a device control module ("DCM") (e.g., 162) for carrying out and coordinating various computer-implemented processes of the digital signage device (e.g., 160). In one embodiment, such processes include coordinating acquisition of information relating to various media campaigns from the SDCMS 101. Further, in one embodiment, a digital signage device is equipped with a media player (e.g., 164) for displaying various media content on the signage device 160. The digital signage device computer system 166 will be discussed further in relation to FIG. 2.

As indicated, according to the embodiment shown in FIG. 1, the SDCMS 101 is in operative connection with signage device 160 via a network 185. According to one aspect, to prevent unwanted access to the signage device 160 by hackers or others with malicious intent, and to prevent unwanted content from being delivered to the signage device 160 via the network 185, the SDCMS 101 only responds to requests from the signage device 160, and sends no unsolicited content.

As indicated, according to the exemplary system architecture of an SDCMS 101 as shown in FIG. 1, an SDCMS 101 can be a scalable cloud system. As shown and discussed previously, an SDCMS 101 comprises at least a digital signage control server ("DSCS") 120, a central data module 130, a puppet server 180, and a storage service 150. According to one embodiment, the various components are servers or collections of modules comprising databases and various software as well as hardware. Further, according to one embodiment, components of an SDCMS 101 hosted in a cloud system can be operatively connected and communicate via a network 185 (i.e., via the Internet), as shown in FIG. 1, as noted.

According to one embodiment, an SDCMS 101 may comprise a media deployment module 110. In general, the media deployment module 110 in accordance with a user's instructions facilitates the deployment of one or more media files from one or more storage servers to one or more signage devices. The user can directly specify the selected timeslots and signage devices for displaying a media file. Alternatively, the user can specify certain criteria for selecting timeslots and signage devices for a specific campaign. The media deployment module 110 then utilizes certain determination logic to determine the specific timeslots and signage devices for displaying the media file in accordance with the user's criteria. Subsequently, according to one embodiment, the media deployment module 110 then generates a media deployment plan, which specifies which content is to be presenting on which signage devices at which times.

In certain embodiments, the central data module 130 provides a centralized data store for storing all or most information other than media files used by the SDCMS 101. Generally, the media files uploaded by the end users into the SDCMS 101 typically are stored in the storage server 150. The central data module 130, however, can store a collection of data specifying all the media files. Data relating to a particular media file can be organized in a particular media-file data structure. For example, data relating to a particular media file can include one or more of: the title of the file, the length of the file, the size of the file, the format of the file, a description of the contents of the file, a product category of the product being presented in an advertisement file, the target audience (e.g., demographic information) of the file, the target venues at which the file should be played. Further, the data also includes a storage link which can be used to retrieve the media file from the storage server 150.

Additionally, the central data module 130 can store a collection of data specifying each signage device (e.g., 160) managed by the SDCMS 101. Further, data relating to a particular signage device (e.g., 160) can be organized in a particular signage device data structure, as shown as signage device information 125. For example, data relating to the particular signage device 160 can include one or more of: a signage device ID identifying this particular signage device 160, one or more group IDs identifying one or more groups to which this particular signage device 160 belongs, one or more network IDs identifying the one or more networks to which this particular signage device 160 belongs, the popularity of the particular signage device 160, and the technical specification (e.g. resolution, size, 3-D features, etc.) of the particular signage device 160. As will be discussed, such signage device information 125 is received from the signage device 160 and may be used to authenticate the signage device 160 and register the signage device 160 as a part of the global network of signage devices managed by the SDCMS 101.

Further, the central data module 130 can store a collection of data specifying campaign deployment plans for each individual campaign, as discussed above. Further, data relating to a particular campaign deployment plan can be organized in a particular campaign-deployment-plan data structure. For example, data relating to a particular campaign deployment plan can include one or more of: a campaign ID identifying the campaign to which the particular deployment plan is directed, and one or more deployment entries. Each deployment entry can specify a content ID identifying a media file that is to be deployed, a group ID identifying the group of signage devices to which a media file should be deployed or a signage device ID identifying a particular signage device to which a media file should be deployed, a timeslot in which the deployed media file should be displayed, and a payment status indicating whether full, partial, or no payment has been remitted in relation to the campaign.

In one embodiment, the central data module 130 receives a write instruction from the media deployment module 110 specifying content and other information to be stored in the storage service in association with a particular campaign deployment plan.

According to FIG. 1 embodiment of the SDCMS 101 also comprises a DSCS 120, which is in communication with the signage device 160. In the presently disclosed embodiment, the DSCS 120 manages communications between the SDCMS 101 and the various signage devices (e.g., 160). As noted previously, according to one embodiment, the DSCS 120 only responds to requests from the DCM 162 of a signage device 160, and does not send unsolicited information.

According to one embodiment, the DSCS 120 is configured to receive certain signage device information from the signage device 160 that is used to authenticate the signage device 160. This information can further be used to register the signage device 160 to the global network of signage devices managed by the SDCMS 101. In one embodiment, such signage device information may include a signage device ID identifying a particular signage device (e.g., 160), one or more group IDs identifying one or more groups to which the signage device belongs, one or more network IDs identifying networks to which the device belongs, or other technical information relating to the device.

In one embodiment, the DSCS 120 can receive a campaign deployment instruction from the media deployment module 110. The campaign deployment instruction informs the DSCS 120 that a specific campaign is ready to be deployed to the intended signage devices. According to one embodiment, the campaign deployment instruction comprises the campaign ID. The DSCS 120 then can obtain a campaign deployment plan for that specific campaign. Based on the campaign deployment plan, the DSCS 120 can determine what media files should be distributed to which signage devices. Using the content IDs specified in the campaign deployment plan, the DSCS 120 can query the central data module 130 to obtain a storage link that can be used to retrieve the corresponding media file from the storage server 150. Further, the DSCS 120 can query the central data module 130 for the payment status associated with the timeslots specified in the campaign deployment plan.

In one embodiment, the DSCS 120 can generate a program list for each signage device specified in the campaign deployment plan. Typically, the program list will be specific to a particular signage device (identified by its signage device ID), and will include links to the media content that should be displayed on the signage device at a particular timeslot. Further, the program list may include the payment status for the particular timeslots. As will be understood and appreciated, generating a signage-device-specific program list makes it unnecessary to send the entire campaign deployment plan to each signage device specified in the plan. Then, the next time a signage device makes an inquiry to the DSCS 120 for available content to be delivered to that signage device, the DSCS 120 can transmit the program list to the signage device to inform the signage device of the media files and the associated storage links of the media files.

As noted, in certain embodiments, the media deployment module 110 instructs the DSCS 120 that a particular campaign is ready to be deployed by sending a campaign ID to the DSCS 120 in a message. Using the campaign ID, the DSCS 120 can retrieve a campaign deployment plan from the central data module 130. As described above, the campaign deployment plan specifies detail information regarding a particular campaign such as what media files should be played at which signage device at which timeslots. In certain embodiments, a signage device can periodically send requests to the DSCS 120 to check if there are media files or program lists available to that signage device. The DSCS 120, in turn, can examine the campaign deployment plan to determine whether a program list or updated program list is to be deployed to that signage device and then informs the results to the signage device.

Further, according to the FIG. 1 embodiment, the SDCMS 101 comprises a puppet server 180 for managing various computer-implemented processes associated with managing the configuration and transmission of the preferred operating system and associated software modules, configuration parameters and device drivers, as will be discussed herein. In one embodiment, the puppet server 180 manages transmission of a device control module ("DCM") to the signage device, which allows the signage device to communicate with the DSCS 120 and thereby receive media content, playlists, etc.

According to the FIG. 1 embodiment, the puppet server 180 is configured to receive information from a signage device 160, via a puppet client 245 installed via a detachable bootable data storage medium 260, as will be discussed in relation to FIG. 2A. Generally, information received by the puppet server 180 may include information relating to the signage device's 160 various system resources, including both computer software and hardware information. In one embodiment, the puppet server 180 compiles and stores the information received from a specific signage device 160 and maintains a signage device-specific catalog containing the software and hardware information. The puppet server likewise determines various resource dependencies based on the received information and the device-specific catalog. In one embodiment, the puppet server 180 then provides the computer system 166 of the signage device 160 with appropriate resources (e.g., configuration parameters, device drivers, software modules) that allow the signage device 160 to be incorporated into the global network of signage devices managed by the SDCMS 101.

In one embodiment, the puppet server 180 maintains historical information relating to computer software and hardware information received from various signage devices and the various resource dependencies of those signage devices. Further, the puppet server 180 maintains historical information relating to the configuration parameters, device drivers, software modules, etc., designated for the various signage devices based on their hardware and software configurations. In certain embodiments, the puppet server 180 may maintain a multitude of "packages" (i.e., collections of configuration parameters, device drivers, software modules, etc.) designated for various signage device configurations.

In certain embodiments, the storage server 150 provides a mechanism to allow other components of the SDCMS 101 to store data objects in the storage server 150. For example, the storage server 150 can provide a write function that another component can call to pass on a data object. After receiving the data object, the storage server 150 stores the data object and generates a data-object identifier identifying the stored data object. The storage server 150 can return the data-object identifier back to the component requesting to store the data object. The storage server 150 can further provide a read function that another component can call to retrieve a data objects stored in the storage server 150 using a data-object identifier. As stated, the storage server 150 can retrieve the data object identified by the data-object identifier and return the retrieved data object back to the component requesting to retrieve the data object.

In certain embodiments, the storage server 150 operates in conjunction with a storage manager 145 to provide a distributed mechanism to deliver media files stored in the storage server 150 to signage devices. As has been discussed, each signage device (e.g., 160) periodically queries the DSCS 120 to check if any media file is ready to be deployed to that signage device 160. As discussed above, the DSCS 120 checks the current campaign deployment plan to determine whether there is any media file to be deployed to the inquiring signage device 160. As discussed, the DSCS 120 may also check the current campaign deployment play to determine whether payment has been remitted in relation to the plan.

When there is a media file to be deployed, the DSCS 120 returns, among other things, the storage link of the media file. The storage link indicates the location of the storage manager and the data object identifier identifying the media file stored in the storage server 150. Subsequently, the storage manager 145 can then receive from a signage device 160 a request for a particular media file using a storage link. Based on the request, the storage manager 145 can then assist in the process of delivering the content to the signage device 160.

As indicated, according to the embodiment shown in FIG. 1, the SDCMS 101 is in operative connection with a signage device 160 via a network, which may be connected to a router or similar device, which manages communications between the various components of the SDCMS 101 and the signage device 160.

The discussions above in association with FIG. 1 are merely intended to provide an overview of an embodiment of the present system. Accordingly, it will be understood that the descriptions in this disclosure are not intended to limit in any way the scope of the present disclosure. Various architectural details of an embodiment of the disclosed SDCMS 101 will be described next in greater detail.

Figure 2A:
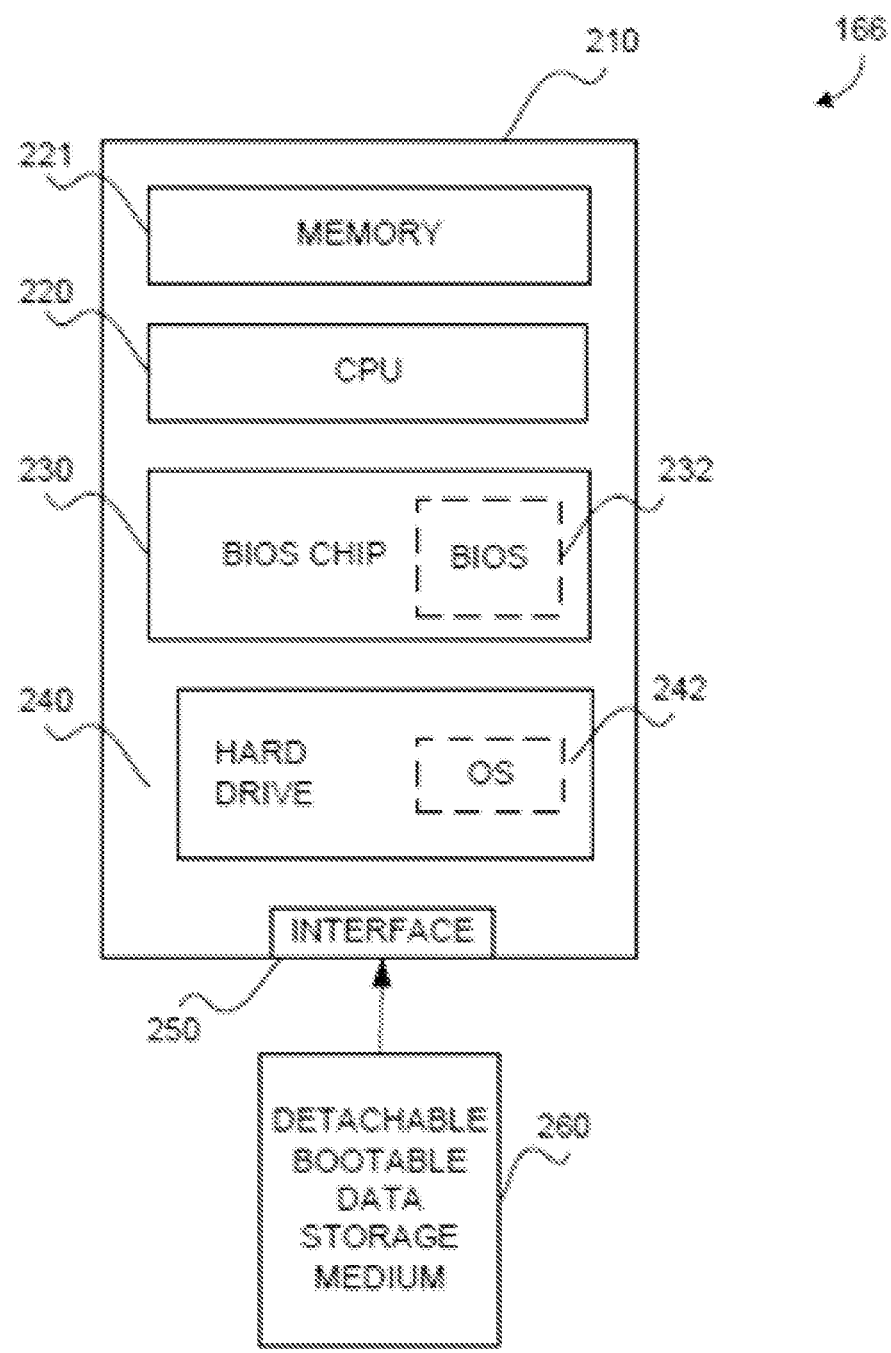
FIG. 2A schematically depicts an exemplary digital signage device computer system having an existing operating system ("OS"), according to one embodiment of the present disclosure.

FIG. 2A schematically depicts a digital signage device computer system 166 having an existing OS 242, according to one embodiment of the present disclosure. As shown in FIG. 2A, a computer system 166 is provided as an embedded computer for a digital signage device 160. The computer system 166 of FIG. 2A merely represents an exemplary embodiment of the present disclosure, and therefore should not be considered to limit the disclosure in any manner. In some embodiments, the computer system 166 may include other physical or virtual components not shown in FIG. 2A for purposes not mentioned in the disclosure.

In the computer system 166, a chassis 210 is provided to enclose various components or devices of the computer system 166. Although not explicitly shown in FIG. 2A, a baseboard is provided in the chassis 210, which is a printed circuit board upon which a plurality of interconnected components or devices may be disposed. The layout of the components on the baseboard and the manner of the interconnection between the components on the baseboard is herein referred to as the "configuration" of the baseboard. One of ordinary skill in the art would appreciate that the configuration of the baseboard may be adjusted or changed according to the necessary design or manufacturing requirements.

In one embodiment, the components in the chassis 210 include, but are not limited to, a central processing unit (CPU) 220, a memory 221, a Basic Input/Output System (BIOS) chip 230, a hard drive 240, an interface 250, and other required memory and input/output modules (not shown). Further, a detachable bootable data storage medium 260 is provided outside the chassis 210, and the detachable bootable data storage medium 260 is connected to the computer system 166 through the interface 250. In certain embodiments, the interface between the components may be physical hardware interface such as electrical connectors, buses, ports, cables, terminals, or other I/O devices. The CPU 220 is a host processor which is configured to control operation of the computer system 166. In some embodiments, one of ordinary skill in the art would appreciate that the computer system 166 may run on or more than one CPU as the host processor, such as two CPUs or any suitable number of CPUs.

The BIOS chip 230 serves as a crucial component of the computer system 166. The BIOS chip 230 is in communication to the CPU 220 and is configured to store the BIOS software (hereinafter BIOS) 232 for performing the booting functions, as will be described below. Generally, the BIOS chip 230 is a non-volatile chip, such as a flash memory chip or an EEPROM chip. The BIOS 232 is in communication with a complementary metal oxide semiconductor (CMOS) memory. Initial settings and configurations of the BIOS may be stored in the CMOS memory.

Settings in the BIOS chip 230 may specify a set of storage devices (designated as "bootable data storage devices" or a "bootable devices") from which the computer system 166 may boot. In one embodiment, when the computer system 166 starts up, the first job for the BIOS 232 is the power-on self-test, which initializes and identifies the system hardware devices, such as the CPU 220, memory and storage devices, display card, keyboard and mouse, and other hardware devices. The BIOS 232 then attempts to boot the computer system 166, i.e., instructs the CPU 220 to read and execute an OS (e.g., 242) from the devices as specified in the BIOS 232. Typically, the BIOS 232 attempts to load, i.e., instruct the CPU 220 to read and execute, the boot loader software from a specified device. The boot loader software then loads an OS (e.g., 242) from that bootable device. As will be understood by one of ordinary skill in the art, an OS is a collection of software managing computer hardware resources and software programs. Thus, the CPU 220 can execute the OS (e.g., 242) and run an instance of the OS. Accordingly, the control of the computer system 166 is given to the OS 242. This process is known as booting, or booting up, which is short for bootstrapping.

In certain embodiments, the BIOS chip 230 can also be a bootable data storage medium, and the computer system 166 may be bootable from the BIOS chip 230 if necessary booting software is provided in the BIOS chip 230.

Figure 2B:
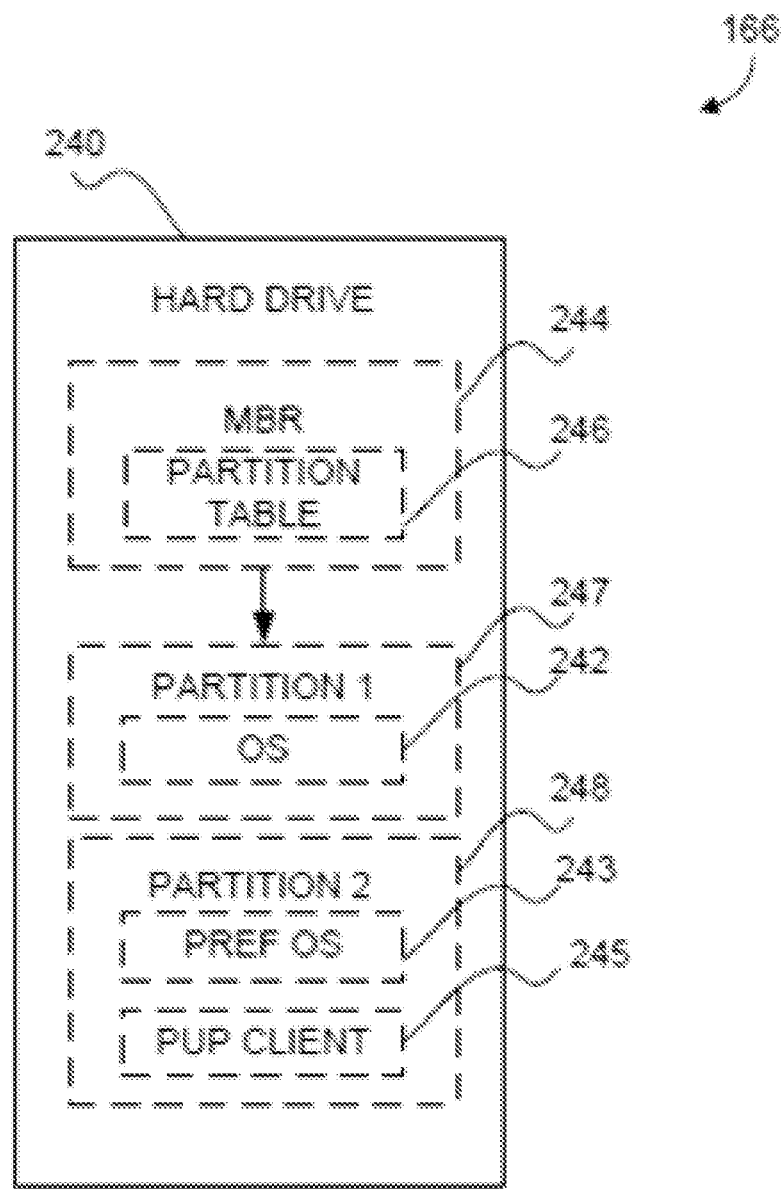
FIG. 2B schematically depicts a configuration of the hard drive of the computer system of FIG. 2A, according to one embodiment of the present disclosure.

In the FIG. 2A embodiment, the hard drive 240 is a block-based bootable data storage medium. Specifically, the hard drive 240 may be logically divided into a plurality of logical storage units, which are referred to as "partitions." FIG. 2B schematically depicts a configuration of the hard drive of the computer system of FIG. 1A according to one embodiment of the present disclosure. As shown in FIG. 2B, the hard drive 240 includes a first partition 247 storing the existing OS 242. The first partition 247 can be an active bootable partition of the hard drive 240. In the FIG. 2B embodiment, the existing OS 242 has been configured to be run directly on the computer system 166. In other words, during a booting process, the BIOS 232 loads the existing OS 242. In such an instance, the running instance of the existing OS 242 can be the only operating system that manages the resources of the computer system 166. Further, the hard drive 240 also includes a master boot record (MBR) 244 having a partition table 246.

In certain embodiments, the hard drive 240 may include a second partition 248, as shown in the FIG. 2B embodiment, or various additional partitions. The partition table 246 indicates, among other things, which of the partitions of the hard drive 240 is the active bootable partition. As shown in FIG. 2B, the first partition 247 storing the existing OS 242 is a bootable partition. The MBR 244 and the partition table 246 indicate that the first partition 247 is the active bootable partition, according to the FIG. 2B embodiment. Thus, when the computer system 166 boots from the hard drive 240, the existing OS 142 stored in the first partition 247 of the hard drive 240 will be launched and executed.

As will be discussed herein, the MBR 244 and partition table 246 can be modified to indicate that the second partition 248 is the active bootable portion, and the preferred OS 243 stored in the second partition 248 of the hard drive 240 should be launched and executed.

Referring back to FIG. 2A, the interface 250 is a physical input/output hardware provided on the chassis 210 for connecting the detachable bootable data storage medium 260 to connect to the computer system 166. In certain embodiments, the interface 250 may be electrical connectors, buses, ports, cables, terminals, or other I/O devices corresponding to the detachable bootable data storage medium 260.

The detachable bootable data storage medium 260 is a physical data storage device detachably connected to the computer system 166 through the interface 250. In certain embodiments, the detachable bootable data storage medium 260 may be any portable and bootable data storage device such as a memory card, a USB drive, a soft disk drive, a portable hard drive, an optical disk drive, a data cartridge, a network storage device, or any other type of portable and detachable data storage devices. To simplify the description, the USB drive will be used as an example of the detachable bootable data storage medium 260, and in this case, the corresponding interface 250 will be a USB port. As described above, when the computer system 166 starts up, the BIOS 232 performs the booting process for booting the existing OS 242 from the hard drive 240. The computer system 166 then operates under the management of the existing OS 242.

In one embodiment, as noted above, an alternate OS can be specified as the preferred OS 243 of the computer system 166. In certain embodiments, such a preferred OS 243 may not be preinstalled on the hard drive 240 of the existing computer system 166. In such cases, it may be necessary to install the preferred OS 243 from a detachable bootable data storage medium 260, such as the USB drive shown in FIG. 2A. Therefore, in one embodiment, to install a preferred OS 243 to the computer system 166 of the digital signage device, initially the BIOS 232 and the CMOS memory of the computer system 166 are modified, as necessary, to specify that a USB drive (i.e., 260) is the first option of devices from which the computer system 166 is allowed to boot.

According to the FIG. 2A embodiment, the preferred OS 243 and other components for use in updating the signage device's existing OS 242 are preloaded onto the USB drive 260. According to one embodiment, the additional components include certain software such as an installer and puppet client 245 for communicating with a puppet server 180 of the SDCMS 101. The preferred OS 243 and associated components are stored in the USB drive 260 as bootable files. Thus, when the computer system 166 is powered on, the BIOS 232 of the computer system 166, in accordance with the configuration of the CMOS, can instruct the CPU 220 to attempt to boot from the attached USB drive 260.

As shown in FIG. 2A, the USB drive 260 storing the preferred OS 243 and associated components can be inserted to the USB interface 250 of the computer system 166. According to one embodiment, the BIOS 232 then instructs the CPU 220 to boot the computer system 166 from the USB drive 260. Under the instruction of a boot loader, according to one embodiment, the CPU 220 loads an installer into the memory 221 and executes the installer. Once running, the installer then loads the preferred OS 243 and puppet client 245 onto the hard drive 240. Further, the installer updates the MBR 244 to specify that the preferred OS 243 will take priority over the existing native OS 242.

As discussed above and as shown in FIG. 2B, the existing MBR 244 has a partition table 246 indicating the active bootable partition of the hard drive 240, which is located in the first partition 247. According to one embodiment, the installer can copy the preferred OS 243 and puppet client 245 from the USB 260 to the second partition 248. The installer can then modify the partition table 246 of the MBR 244 of the hard drive 240 to indicate that the second partition 248 storing the preferred OS 243 is the active bootable portion.

Once the preferred OS 243 and puppet client 245 have been copied to the second partition 248 of the physical hard drive 240 and MBR 244 has been appropriately updated, in the next booting process, the computer system 166 can boot the preferred OS 243 even if the USB drive 260 has been removed from the computer system 166. More specifically, initially the BIOS 232 determines that the hard drive 240 is the device from which an OS should be loaded by the BIOS 232. Then, the BIOS 232 reads the modified MBR 244 of the hard drive 240. The modified MBR 244 of the hard drive 240 now indicates that the second partition 248 storing the preferred OS 243 is the active bootable partition. Accordingly, the BIOS 232 instructs the CPU 220 to read the boot loader from the second partition 248. Subsequently, the boot loader instructs the CPU 220 to load the preferred OS 243 from the second partition 248. In certain embodiments, during the installation process, system modifications, other than modifying the BIOS 232 in order to boot from the USB drive 260, may not be necessary in order to install the preferred OS 243. There is no destructive change to the existing OS 242 stored in the hard drive 240. In other words, the installation of the preferred OS 243 to the computer system 166 is non-destructive, and a user can revert back if the existing OS 242 if they so choose.

In one embodiment, after the BIOS 232 instructs the CPU 220 to read the boot loader from the second partition 248 and instructs the CPU 220 to load the preferred OS 243, and control of the computer system 166 is transferred to the preferred OS 243, the puppet client 245 can detect the hardware configuration of the computer system 166 including the CPU 220, the memory 221, the disks, I/O devices, network devices, etc., as well as other software modules and signage device's 160 identifying information. The puppet client 245 is then able to communicate this information to the puppet server 180, which, as previously discussed, compiles and stores information received from the puppet client 245 and maintains a catalog of the hardware and software information specific to the signage device 160. Further, according to one embodiment, the puppet server 180 provides the puppet client 245 with resources appropriate to the signage device 160 such as configuration parameters, device drivers, software modules, etc., which the puppet client 245 installs and saves to the hard drive 240. According to one aspect, the software modules received from the puppet server 180 of the SDCMS 101 may include a media player manager for managing display of media content on the media player 164 as well as a device control module ("DCM) 162, as shown in FIG. 1, as well as various other software modules.

Further, according to one embodiment, once the puppet client 245 installs the DCM 162, the DCM 162 may provide signage device identifying information to the DSCS 120, which is used to authenticate the signage device 160 and register the signage device 160 to the global network of signage devices managed by the SDCMS 101. As previously noted, such signage device identifying information may include a signage device ID identifying a particular signage device (e.g., 160), one or more group IDs identifying one or more groups to which the signage device belongs, one or more network IDs identifying networks to which the device belongs, or other technical information relating to the device.

Figure 3A:
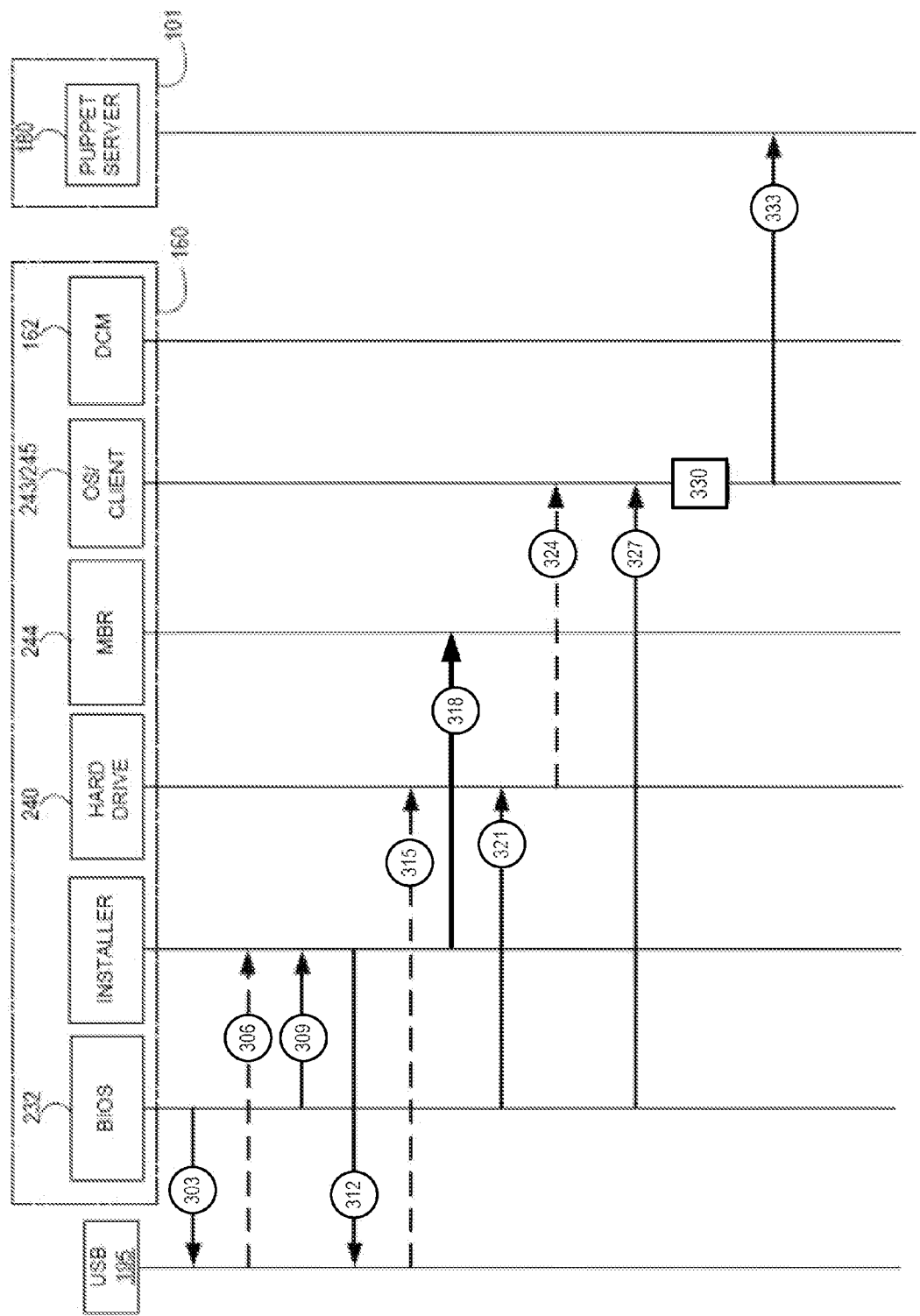

FIGS. 3A and 3B represent a sequence diagram illustrating an exemplary process whereby a preferred OS 243 and puppet client are installed onto a signage device 160 from a USB device 195, and the signage device is authenticated and added to the global network of signage devices managed by the SDCMS 101.

As shown in FIG. 3A, after a USB 195 is inserted into the interface 150 of a signage device 160, the BIOS 232 instructs the CPU 220 to load (at 306) and execute (at 309) the installer. Subsequently, at 312, the installer loads the preferred OS 243 and puppet client 245, which are stored on the hard drive 240 at 315, according to the FIG. 3 embodiment. Additionally, at 318, the installer updates the MBR 244 to specify that the preferred OS 243 is to take priority over the original OS 242 during the booting process.

After updating the MBR 244, according to one embodiment and as previously discussed, the BIOS 232 boots the preferred OS 243 and puppet client 245 from the hard drive 240, at 321. As will be understood and appreciated, booting the preferred OS 243 and puppet client 245 from the hard drive 240 removes the necessity of booting from the USB 195. According to one embodiment, after the BIOS 232 launches the preferred OS 243 and puppet client 245, at 324, the BIOS transfers control of the computer system to the preferred OS 243, at 327. After control of the computer system is transferred to the preferred OS 243, according to one embodiment, the puppet client 245 can scan the computer system 166 to detect the hardware configuration and any software applications installed on the signage device 160, at 330. Subsequently, the puppet client 245 transmits the information relating to the hardware configuration and software modules to the puppet server 180, at 333. As previously discussed, the puppet server 180 is able to use the received information to provide appropriate resources to the signage device 160 that allow the signage device 160 to work as within the global network of signage devices managed by the SDCMS 101.

Continuing to FIG. 3B, as shown, after analyzing the information received from the puppet client 245, the puppet server 180 transmits resources appropriate to the signage device 160 such as configuration parameters, device drivers, software modules, etc., to the puppet client 245, at 336. Upon receipt of the resources, the puppet client 245 installs the resources at 339 and stores the resources to the hard drive 240, at 342. As noted previously, according to one embodiment, the resources include various software modules, which generally include a device control module ("DCM") 162, which is configured to carry out and coordinate various computer-implemented processes of the signage device 160. In the FIG. 3 embodiment, after storing the resources, the puppet client 245 launches the DCM 162, at 345. The DCM 162 then establishes communication with the DSCS 120 of the SDCMS 101, as previously discussed. At 348, the DCM 162 transmits signage device identifying information to the DSCS 120 such that the DSCS 120 can authenticate the signage device 160 and add the signage device 160 to the global network of managed signage devices.

Upon receipt of the signage device identifying information, at 351, the DSCS 120 registers the signage device 160 based on the received information. As previously noted, the signage device identifying information may include a signage device ID identifying a particular signage device (e.g., 160), one or more group IDs identifying one or more groups to which the signage device belongs, one or more network IDs identifying networks to which the device belongs, or other technical information relating to the device. Subsequently, after registering the device, the DSCS 120 stores the signage device identifying information in a signage device data structure (i.e., 125) to the central data module 130.

Systems and methods disclosed herein may be implemented in digital electronic circuitry, in computer hardware, firmware, software, or in combinations of them. Apparatus of the claimed invention can be implemented in a computer program product tangibly embodied in a machine-readable storage device for execution by a programmable processor. Method steps according to the claimed invention can be performed by a programmable processor executing a program of instructions to perform functions of the claimed invention by operating based on input data, and by generating output data. The claimed invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories. Storage devices suitable for tangibly embodying computer program instructions and data include forms of non-volatile memory, including by way of example, semiconductor memory devices, such as EPROM, EEPROM, and flash memory devices; magnetic disks such as internal hard disks and removable disks; magneto-optical disks; and Compact Disk. Any of the foregoing can be supplemented by or incorporated in ASICs (application-specific integrated circuits).

The foregoing description of the exemplary embodiments has been presented only for the purposes of illustration and description and is not intended to be exhaustive or to limit the inventions to the precise forms disclosed. Many modifications and variations are possible in light of the above teaching. The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A computer-implemented method for updating an existing operating system of a signage device having a computer system and registering the signage device with a Digital Signage Device Central Management System (SDCMS) comprising:

loading an installer into memory of the signage device computer system from a detachable bootable data storage medium;

loading a preferred operating system and client software via the installer onto a hard drive of the signage device computer system from the detachable bootable data storage medium;

updating a master boot registry of the signage device computer system via the installer to indicate priority of the preferred operating system;

booting the preferred operating system and the client software from the hard drive of the signage device computer system;

detecting signage device computer system configuration information via the client software;

transmitting the signage device computer system configuration information to a management server of the SDCMS, wherein the management server determines resources appropriate for the signage device computer system based on the received signage device computer system configuration information, and wherein the resources comprise a device control module (DCM);
receiving the resources at the client software from the management server of the SDCMS; and
in response to receiving the resources at the client software, executing, by the client software, the DCM; and
transmitting, by the executed DCM, signage device identifying information to the management server of the SDCMS,
wherein the management server of the SDCMS utilizes the signage device identifying information to register the signage device to a global network of managed signage devices.

2. The method of claim 1, wherein the detachable data storage medium is selected from the group comprising: memory card, USB drive, soft disk drive, portable hard drive, optical disk drive, data cartridge, and network storage device.

3. The method of claim 1, wherein the signage device computer system configuration information comprises information relating to the group comprising: CPU, disks, I/O devices, network devices, and software modules.

4. The method of claim 1, wherein the resources appropriate for the signage device computer system are selected from the group comprising: configuration parameters, device drivers, and software modules.

5. The method of claim 4, wherein the software modules comprise the DCM.

6. The method of claim 1, wherein the preferred operating system is a Linux-based operating system.

7. The method of claim 6, wherein the preferred operating system is Ubuntu.

8. The method of claim 1, wherein the hard drive of the signage device computer system is logically divided into a plurality of logical storage units.

9. The method of claim 8, wherein the logical storage units are partitions.

10. The method of claim 9, wherein the existing operating system and the preferred operating system are stored in separate partitions.

11. A signage device, comprising:
a computer system, comprising a central processing unit (CPU), a memory, a basic input/output system (BIOS) chip storing a BIOS, a hard drive storing an existing operating system, and a detachable bootable data storage medium, wherein the BIOS, when executed at the CPU, is configured to
load an installer into the memory from the detachable bootable data storage medium;
load a preferred operating system and client software via the installer onto the hard drive from the detachable bootable data storage medium;
update a master boot registry via the installer to indicate priority of the preferred operating system;
boot the preferred operating system and the client software from the hard drive;
detect configuration information via the client software;
transmit the configuration information to a management server of a Digital Signage Device Central Management System (SDCMS), wherein the management server determines resources appropriate for the computer system based on the received configuration information, and wherein the resources comprise a device control module (DCM);
receive, at the client software, the resources from the management server of the SDCMS; and
in response to receiving the resources at the client software, execute, by the client software, the DCM; and
transmit, by the executed DCM, signage device identifying information to the management server of the SDCMS, wherein the management server of the SDCMS utilizes the signage device identifying information to register the signage device to a global network of managed signage devices.

12. The signage device of claim 11, wherein the detachable data storage medium is selected from the group comprising: memory card, USB drive, soft disk drive, portable hard drive, optical disk drive, data cartridge, and network storage device.

13. The signage device of claim 11, wherein the configuration information comprises information relating to the group comprising: the CPU, disks, I/O devices, network devices, and software modules.

14. The signage device of claim 11, wherein the resources are selected from the group comprising: configuration parameters, device drivers, and software modules.

15. The signage device of claim 14, wherein the software modules comprise the DCM.

16. The signage device of claim 11, wherein the preferred operating system is a Linux-based operating system.

17. The signage device of claim 11, wherein the hard drive is logically divided into a plurality of partitions.

18. The signage device of claim 17, wherein the existing operating system and the preferred operating system are stored in separate partitions.

19. A non-transitory computer readable medium storing computer executable codes, wherein the codes, when executed at a processor, are configured to load an installer into memory of a computer system of a signage device from a detachable bootable data storage medium;
load a preferred operating system and client software via the installer onto a hard drive of the computer system from the detachable bootable data storage medium;
update a master boot registry of the computer system via the installer to indicate priority of the preferred operating system;
boot the preferred operating system and the client software from the hard drive;
detect configuration information of the computer system via the client software;
transmit the configuration information to a management server of a Digital Signage Device Central Management System (SDCMS), wherein the management server determines resources appropriate for the computer system based on the received configuration information, and wherein the resources comprise a device control module (DCM);
receive, at the client software, the resources from the management server of the SDCMS; and
in response to receiving the resources at the client software, execute, by the client software, the DCM; and
transmit, by the executed DCM, signage device identifying information to the management server of the SDCMS, wherein the management server of the SDCMS utilizes the signage device identifying information to register the signage device to a global network of managed signage devices.

20. The non-transitory computer readable medium of claim 19, wherein the detachable data storage medium is selected from the group comprising: memory card, USB drive, soft disk drive, portable hard drive, optical disk drive, data cartridge, and network storage device.

21. The non-transitory computer readable medium of claim 19, wherein the configuration information comprises information relating to the group comprising: CPU, disks, I/O devices, network devices, and software modules.

22. The non-transitory computer readable medium of claim 19, wherein the resources are selected from the group comprising: configuration parameters, device drivers, and software modules.

23. The non-transitory computer readable medium of claim 22, wherein the software modules comprise the DCM.

24. The non-transitory computer readable medium of claim 19, wherein the preferred operating system is a Linux-based operating system.

25. The non-transitory computer readable medium of claim 19, wherein the hard drive of the signage device computer system is logically divided into a plurality of partitions, and wherein the existing operating system and the preferred operating system are stored in separate partitions.

* * * * *